(12) United States Patent
Hinata

(10) Patent No.: US 8,022,939 B2
(45) Date of Patent: Sep. 20, 2011

(54) TOUCH PANEL, ELECTRO OPTICAL DEVICE, AND ELECTRONIC APPARATUS

(75) Inventor: Shoji Hinata, Matsumoto (JP)

(73) Assignee: Epson Imaging Devices Corporation (JP)

( * ) Notice: Subject to any disclaimer, the term of this patent is extended or adjusted under 35 U.S.C. 154(b) by 672 days.

(21) Appl. No.: 12/173,308

(22) Filed: Jul. 15, 2008

(65) Prior Publication Data
US 2009/0096754 A1 Apr. 16, 2009

(30) Foreign Application Priority Data

Oct. 12, 2007 (JP) ................................. 2007-266202
Apr. 17, 2008 (JP) ................................. 2008-107531

(51) Int. Cl.
*G06F 3/041* (2006.01)
(52) U.S. Cl. ........................................ 345/173; 345/156
(58) Field of Classification Search .......... 345/156–173; 178/18.03–18.06
See application file for complete search history.

(56) References Cited

U.S. PATENT DOCUMENTS

| 6,078,274 | A | 6/2000 | Inou | |
|---|---|---|---|---|
| 7,602,451 | B2 * | 10/2009 | Hinata | 349/12 |
| 7,911,455 | B2 * | 3/2011 | Nishikawa et al. | 345/173 |
| 2005/0139398 | A1 * | 6/2005 | Endo | 178/18.01 |
| 2007/0080951 | A1 * | 4/2007 | Maruyama et al. | 345/173 |
| 2007/0171144 | A1 * | 7/2007 | Tanada | 345/36 |
| 2008/0007538 | A1 * | 1/2008 | Kotera et al. | 345/173 |
| 2008/0018611 | A1 * | 1/2008 | Serban et al. | 345/173 |
| 2008/0136788 | A1 * | 6/2008 | Nishikawa et al. | 345/173 |

FOREIGN PATENT DOCUMENTS

| JP | 62-190524 | 8/1987 |
|---|---|---|
| JP | 02-126314 | 5/1990 |
| JP | 07-257944 | 10/1995 |
| JP | 10-326152 | 12/1998 |
| JP | 2001-154791 | 6/2001 |
| JP | 2002-014772 | 1/2002 |
| JP | 2002-157089 | 5/2002 |
| JP | 2002-222056 | 8/2002 |
| JP | 2004-021788 | 1/2004 |
| JP | 2007-249260 | 9/2007 |

* cited by examiner

*Primary Examiner* — Nitin Patel

(74) *Attorney, Agent, or Firm* — Harness, Dickey & Pierce, P.L.C.

(57) ABSTRACT

There is provided a touch panel including a first substrate, a second substrate opposing the first substrate, a first electrode film formed on the first substrate, a second electrode film formed on the second substrate, the second electrode film opposing the first electrode film. An openings is formed in each of the first electrode film and the second electrode film, and the opening formed in the first electrode film and the opening formed in the second electrode film are overlapped in plan view and each of the openings has a different opening area.

16 Claims, 8 Drawing Sheets

TOUCH PANEL, ELECTRO OPTICAL DEVICE, AND ELECTRONIC APPARATUS

BACKGROUND

1. Technical Field

The present invention relates to a touch panel, an electro optical device, and an electronic apparatus, and in particular to a structure of a touch panel equipped with a pair of opposing electrode films.

2. Related Art

An example of a general resistance type touch panel is shown in FIG. 12. In the touch panel shown in FIG. 12, a transparent electrode film 4 is formed on a first transparent substrate 1 in a flat manner. Further, a transparent electrode film 5 is formed on a second transparent substrate 2 disposed to have a distance with the first transparent substrate 1 in a flat manner so as to oppose the aforementioned transparent electrode film 4. The pair of transparent electrode films 4, 5 are normally oppositely disposed to each other to have a distance. When an outer surface of the second transparent substrate 2 is pressed by a finger, a touch pen, or the like, the pair of the transparent electrode films 4, 5 are made contact with each other by deflection occurred at the pressed position, and an output value corresponding to the contact position can be obtained.

The aforementioned touch panel is used in the state where overlapped and disposed at the viewing side of a display screen of any one of various electro optical devices such as a liquid crystal display body, so that the touch panel is required to have a high transmittance ratio. Consequently, in the past, it has been attempted to increase the transmittance ratio by forming a reflection preventing film on the substrate or on the transparent electrode film (for example, see JP-A-7-257944, JP-A-2002-222056).

Further, it has been known to provide openings in the transparent electrode film of the resistance type touch panel in order to adjust a resistance value of the transparent electrode film (for example, see JP-A-2001-154791, JP-A-62-190524).

However, in the aforementioned touch panel, only the light reflected at a surface or a boundary face of the substrate or the transparent electrode film is reduced even when the reflection preventing film is provided, and the transmittance ratio itself of the transparent electrode film itself is not reduced. Accordingly, there was a limit to improve the transmittance ratio as a touch panel, and there was a problem in that it was difficult to illuminate a display image of the electro optical device disposed behind the touch panel.

Further, each of the opposing surfaces of the aforementioned pair of the transparent electrode films formed by a normal sputtering method becomes an extremely flat surface and becomes a mirror surface state. Consequently, there were also problems in that the transparent electrodes were stuck together when pressed by a finger or a touch pen, and noise was generated when the pair of stuck transparent electrode films was unstuck.

SUMMARY

An advantage of some aspects of the invention is to provide a touch panel whose transmittance ratio is improved by reducing the substantial transmittance ratio of a transparent electrode film itself. Further, another advantage of some aspects of the invention is to prevent generation of noise when a pair of transparent electrode films is stuck or unstuck.

According to an aspect of the invention, there is provided a touch panel including a first substrate, a second substrate opposing the first substrate, a first electrode film formed on the first substrate, a second electrode film formed on the second substrate, the second electrode film opposing the first electrode film. An openings is formed in each of the first electrode film and the second electrode film, and the opening formed in the first electrode film and the opening formed in the second electrode film are overlapped in plan view and each of the openings has a different opening area. The aspect of the invention can be applied to a touch panel which is constituted so as to be able to detect a contact position when the electrode films are deflected by an external pressure to be made contact with each other.

According to the aspect of the invention, attenuation of light caused by absorption of light in the electrode film or reflection of light at a surface or a boundary face of the electrode film does not occur by forming the opening in the electrode film. Accordingly, it becomes possible to increase the transmittance ratio of the touch panel. Further, the surface of the electrode film becomes to have an irregularity since a step corresponding to the thickness of the electrode film is formed at the margin of the opening. Accordingly, sticking of the electrode films to each other can be prevented when pressed and thereby generation of noise can be also prevented when the electrodes are unstuck.

It is preferable that a plurality of the openings is formed in each of the first electrode film and the second electrode film in the aspect of the invention. Herewith, the transmittance ratio of the touch panel is increased in accordance with the ratio of the total of the opening areas of the plurality of openings with respect to a perspective region of the touch panel. When forming the plurality of openings, uniformity of a resistance value of the electrode film per unit area can be assured when the plurality of openings are dispersed and formed at a uniform density in a region where a contact position can be detected. Further, since the uniformity of the transmittance ratio in the perspective region of the touch panel can be assured, display unevenness can be reduced in the case where the touch panel is overlapped and used in a display region of a display device.

In the aspect of the invention, the opening formed in the first electrode film and the opening formed in the second electrode film are overlapped in plan view. Accordingly, an area in which attenuation of light caused by the first electrode film the second electrode film does not occur is formed, so that the transmittance ratio of the touch panel is further increased. Note that in the case where the plurality of openings are formed in each of the first electrode and the second electrode, the plurality of openings formed in the first electrode may be formed so as to overlap with the plurality of openings formed in the first electrode in plan view.

In the aspect of the invention, opening areas of the opening formed in the first electrode film and the opening formed in the second electrode film are different to each other. For example, an opening range of the opening formed in one of the first electrode film and the second electrode film is set smaller than an opening range of the opening formed in the other electrode. Herewith, it becomes possible that the whole opening range of the opening formed in one of the electrode films is to be included in the opening range of the opening formed in the other electrode film. That is, a tolerance region is formed between the margin of the opening formed in one of the electrode films and the margin of the opening formed in the other electrode film. Accordingly, it is possible to constitute so that the area in which the opening ranges are overlapped to each other is not changed even when plan positions of the first electrode and the second electrode are relatively misaligned to a certain degree. According to the aspect of the invention, by setting the opening ranges of the both openings so at to be narrowed or widen in consideration for an error of overlapping when manufacturing, the structure in which the entire opening range of the opening formed in one of the electrode films is included in the opening range of the opening formed in the other electrode film can be provided with a high yield. Accordingly, fluctuation and variation of the area in which the openings are overlapped to each other can be reduced. Herewith, fluctuation of the transmittance ratio is reduced and repeatability of the transparent characteristic is enhanced.

It is preferable that shapes of the opening formed in one of the electrodes and the opening formed in the other electrode are similar to each other. Then, the variation of the transparent characteristic can be restrained even when the first electrode and the second electrode are misaligned in any direction by overlapping the first substrate and the second substrate so that the openings become to have a positional relationship similar to each other.

It is preferable that the openings formed in the first electrode and the second electrode have opening areas whose circle equivalent diameters are within the range of 5 µm to 500 µm in the aspect of the invention. When the circle equivalent diameter of the opening is not more than 5 µm, problems such as difficulty of manufacturing, deterioration of yield, and the like caused by difficulty of patterning of the transparent electrode film, deterioration of the shape accuracy of the opening, and the like become easy to occur. Further, when the circle equivalent diameter exceeds 500 µm, there is a fear that a displayed image is influenced and visibility is deteriorated due to generation of a fringe pattern or deterioration of image quality. Further, when the circle equivalent diameter is further increased, there is a case that the only the opening is pressed and the pair of the electrode films are not made contact in the case where a tapered pressing tool such as a touch pen is used. Particularly, it is preferable that the circular equivalent diameter is within the range of 30 µm to 200 µm from the viewpoint similar to the above.

It is preferable that a reflection preventing film is formed on at least one of the openings. The reflection preventing film may be formed by laminating $SiO_2$, $TiO_2$, or the like or by a single layer. Freedom degree of optical designing for preventing reflection is increased as no transparent electrode film having a high reflective index exists in the openings. That is, it is possible that the reflective index at the opening can be reduced as compared with the portion in which the electrode film exists, and the transmittance ratio as the entire touch panel can be improved. The reflection preventing film can be provided on the surface of the first substrate or the second substrate opposite to the electrode film. Needless to say, the aforementioned effect can be obtained even when the reflection preventing film is provided on the surface of the first substrate or the second substrate on which the electrode film is formed. Further, as a modification example, it is also preferable that the opening is formed in only any one of the first electrode film and the second electrode film, no opening is formed in the other electrode film, and the reflection preventing film is formed on the opening of the one of the electrode films.

It is preferable that the second substrate is to be pressed among the first substrate and the second substrate, an opening area of the opening formed in the second electrode film may be set larger than an opening area of the opening formed in the first electrode film in the aspect of the invention. This is because that visibility is further improved since reflection is reduced at the boundary face between the electrode film and the substrate in the substrate of the viewing side. As a constitutional example, a flexible base material is selected for the second substrate and a base material harder than the second substrate is selected for the first substrate. Herewith, the second substrate is easily deflected by pressing and the first substrate becomes difficult to be deformed.

It is preferable that a spacer is disposed so as to correspond to the opening formed in the first electrode film or the opening formed in the second electrode film in the aspect of the invention. The spacer is provided to keep a distance between the first substrate and the second substrate and to restore the pressed substrate to the original state. Since it can be prevented that the electrode films are inhibited to be made contact with each other by providing the spacer so as to correspond to the opening formed in the electrode film, position detection can be more surely performed. Particularly, when the spacer is disposed at a position at which the opening formed in the first opening and the opening formed in the second opening are overlapped in plan view, the structure can be provided in which the spacer makes contact with neither the first electrode film nor the second electrode film. In this case, it is preferable that the spacer is fixed in the small one of the openings among the openings overlapping to each other in plan view. This is because that the spacer can be settled at a position at which the openings are overlapped to each other even when the first substrate and the second substrate are misaligned in some degree when overlapping to each other. Further, as a modification example, it is possible to employ the structure in which the opening is provided in any one of the first electrode film and the second electrode film and the spacer is disposed to correspond to the opening.

Next, according to another aspect of the invention, there is provided an electro optical device in which the touch panel according to the aspect of the invention is disposed so as to overlap with a display region. By using the aforementioned touch panel, a display screen of an electro optical panel can be illuminated.

Further, according to still another aspect of the invention, there is provided an electro optical device in which a touch panel is disposed so as to overlap with a display region in which a plurality of dots or pixels are arranged. The touch panel includes a first substrate, a second substrate opposing the first substrate, a first electrode film formed on the first substrate, a second electrode film formed on the second substrate, the second electrode film opposing the first electrode film. A plurality of openings are arranged in at least one of the first electrode film and the second electrode film, and an arrangement pitch of the plurality of dots or pixels and an arrangement pitch of the plurality of openings are different. According to the electro optical device of the aspect of the invention, since the pitch of the openings and the pitch of the dots or pixels are different, generation of a moire stripe can be prevented. Further, even when the pitch of the openings and the pitch of the dots or pixels are different, a moire stripe may be generated in the case where the pitch of the openings is a divisor or a multiple of the pitch of the dots or pixels. In this case, the pitch of the openings may be set to avoid a divisor or a multiple of the pitch of the dots or pixel. When the openings are provided in both of the first electrode film and the second electrode film, the pitches of openings of the both electrodes may be set to avoid a divisor or a multiple (including one time) of the pitch of the dots or pixels.

Further, according to still another aspect of the invention, there is provided an electronic apparatus mounting the aforementioned electro optical device. As for the electronic apparatus, there are included various electronic apparatuses having screen operation function equipped with the touch panel, for example, a car navigation device, a television image receiving device, a personal computer, a home electric appliance, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
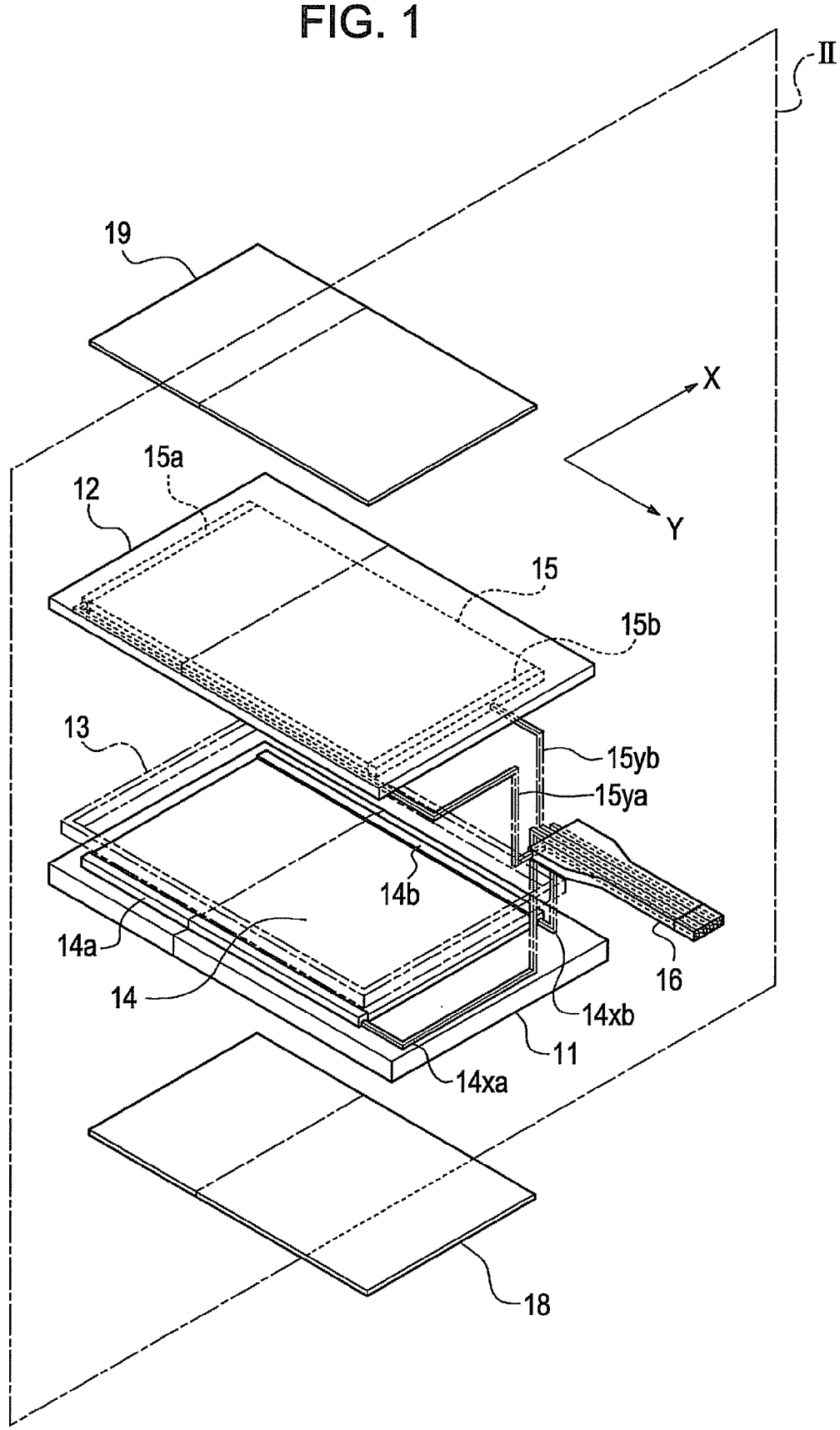
FIG. 1 is an exploded perspective view schematically showing an outline of a structure of each embodiment of a touch panel.
Figure 2:
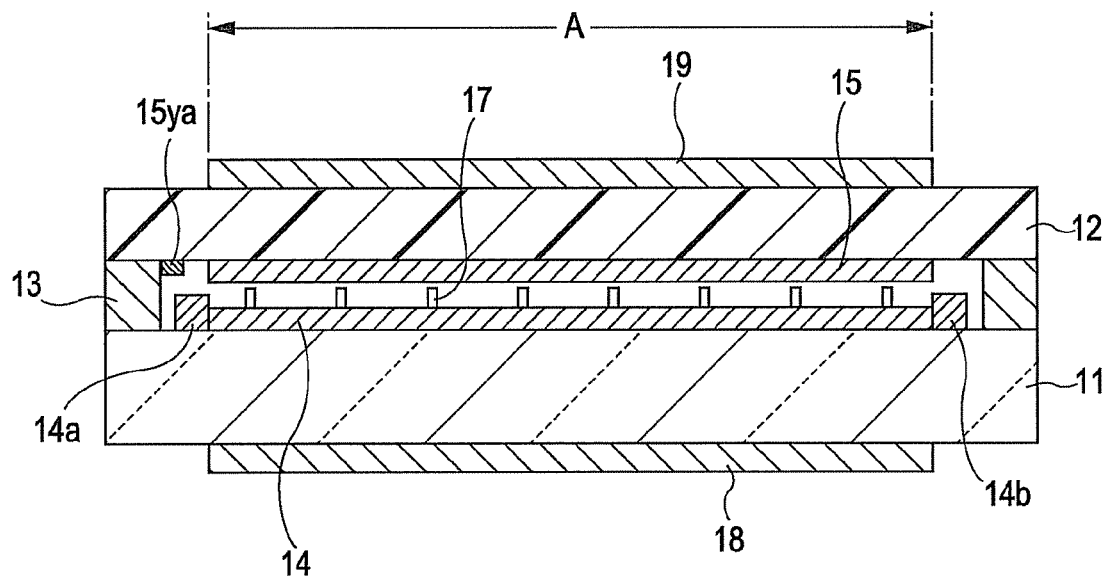
FIG. 2 is a longitudinal section view schematically showing an outline of a structure of each embodiment of a touch panel.

Next, an embodiment of the invention will be described with reference to the accompanying drawings. FIG. 1 is an exploded perspective view showing a touch panel 10 according to the embodiment of the invention, FIG. 2 is a longitudinal section view showing a cross section taken along the virtual vertical plane II of FIG. 1. The touch panel 10 of the embodiment is the one in which a first substrate 11 made of a glass, a rigid plastic, or the like and a second substrate 12 made of a flexible plastic or the like which is bonded to the first substrate 11 via a seal material 13 are oppositely disposed with a distance. An electrode film 14 having optical transparency is formed on the inner surface of the first substrate 11 (surface at the second substrate 12 side) in a flat manner, and an electrode film 15 having optical transparency is formed on the inner surface of the second substrate 12 (surface at the first substrate 11 side) in a flat manner. The electrode films 14, 15 are made of an appropriate conductive material having optical transparency such as ITO (indium tin oxide), $SnO_2$, or the like.

Terminals 14a, 14b are formed at the both ends of the electrode film 14 in the X direction in FIG. 1 with an aluminum film or the like, and wirings 14xa, 14xb are respectively wired from the terminals 14a, 14b. Further, terminals 15a, 15b are formed at the both end of the electrode film 15 in the Y direction perpendicular to the direction X on a plane surface in FIG. 1 with an aluminum film or the like, and wirings 15ya, 15yb are respectively wired from the terminals 15a, 15b. The wirings 14xa, 14xb, 15ya 15yb are respectively conductively connected to a wiring pattern of a wiring member 16 formed by a flexible wiring substrate and the like mounted on the first substrate 11 and the second substrate 12 via an outer margin portion on which the aforementioned electrode films 14, 15 are not formed.

Note that, it is preferable that small spacers 17 (see FIG. 2) having a size by which pressing operation is not blocked for preventing unintended contact occurred by deflection of the second substrate 12 or the like are distributed to be disposed between the aforementioned electrode film 14 and electrode film 15. Preferably, the spacers 17 are fixed on at least one of the electrodes or the substrates. In FIG. 2, the spacers 17 are distributed and formed on the first substrate 11. The spacers 17 are formed in a columnar manner.

A reflection preventing film 18 is formed on the outer surface of the first substrate 11 (surface at the opposite side of the second substrate 12) and a reflection preventing film 19 is formed on the outer surface of the second substrate 12 (surface at the opposite side of the first substrate 11). It is preferable that each of the reflection preventing films 18, 19 has a multi layer structure in which at least two transparent layers having different reflectance ratio, for example, $SiO_2$, $TiO_2$, or the like are laminated to have appropriate thicknesses. However, the reflection preventing films are not limited to have the multi layer structure, and for example, may be constituted by a thin film of a single layer having a reflective index different from that of the first substrate 11 or the second substrate 12. The reflection preventing films 18, 19 reduce light reflected at the inner and outer surfaces of the first substrate 11 or the second substrate 12, and the inner and the outer surfaces of the electrode films 14, 15 and retrain deterioration of transmittance ratio caused by the reflected light.

Note that it is preferable that the aforementioned electrode films and the reflection preventing films are formed on the first substrate 11 and the second substrate 12 by a gas phase method such as a sputtering method, an evaporation method, an ion plating method, a CVD method, or the like. However, the films may be formed by a method except the gas phase method, for example, by applying a coating liquid and curing the coating liquid.

Figure 3:
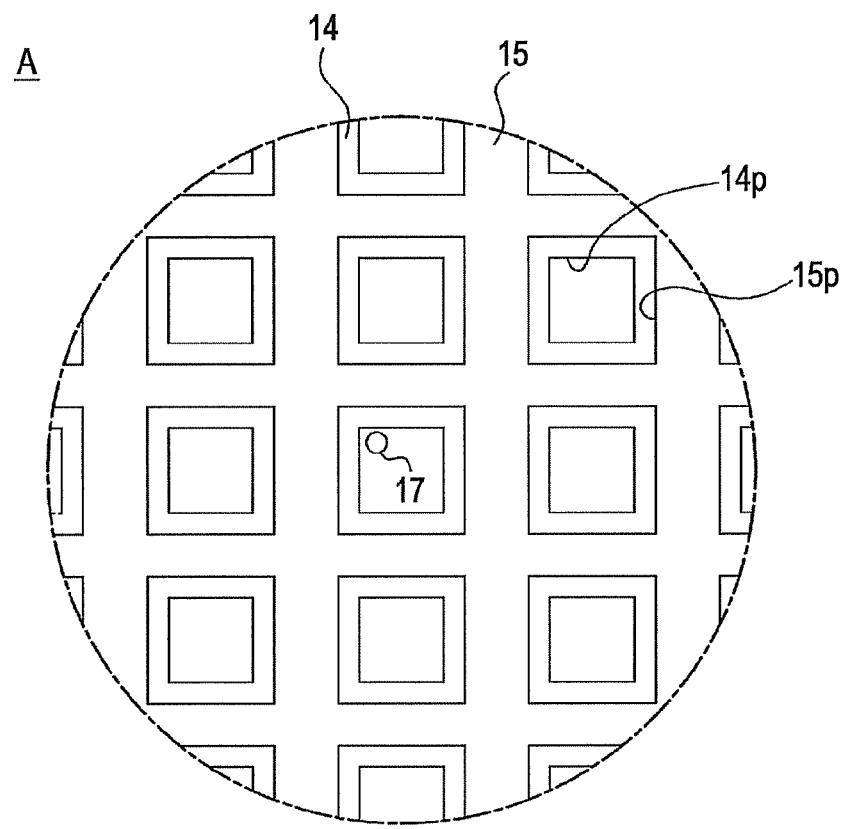
FIG. 3 is a partial enlarged plan view schematically showing an outline of an inner structure of a first embodiment.
Figure 4:
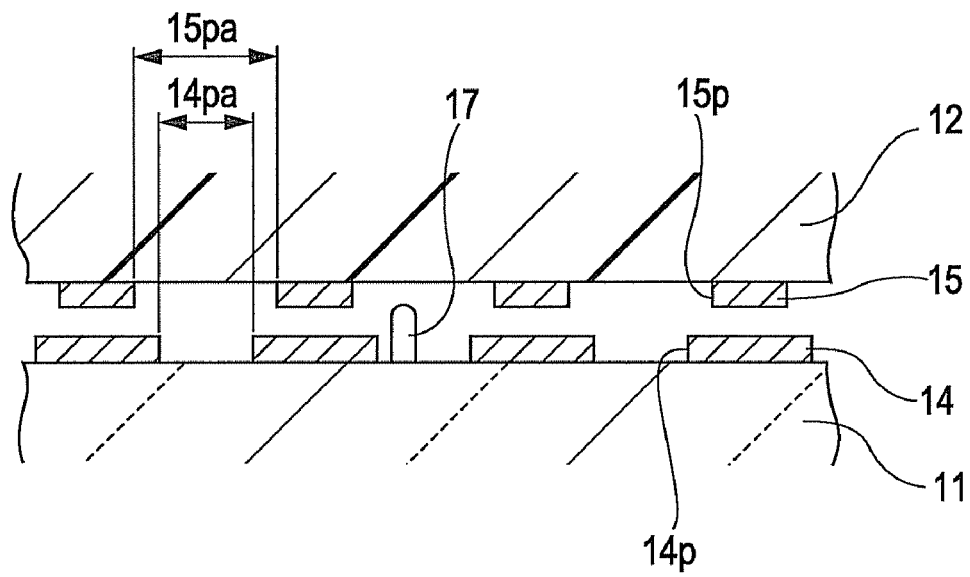
FIG. 4 is a partial enlarged longitudinal section view schematically showing an outline of an inner structure of the first embodiment.

FIG. 3 is a partial enlarged plan view showing a perspective region A shown in FIG. 2, and FIG. 4 is a partial enlarged longitudinal section view showing the perspective region A. In the embodiment, a plurality of openings 14p, 15p are respectively dispersed and formed on the electrode films 14, 15. Each of the plurality of openings 14P has a same opening shape and opening area, and are dispersed and formed at an even density at least in the perspective region A of the touch panel. Further, each of the plurality of openings 15p has a same opening shape and opening area, and are dispersed and formed at an even density at least in the perspective region A of the touch panel. Specifically, each of the openings 14p, 15p shall have a rectangular shape (square shape) and the openings are arranged in the vertical and horizontal directions at intervals.

As described above, by arranging the openings 14p, 15p at intervals (at equal pitches), evenness of a resistance value of the electrode films 14, 15 per a unit area can be assured. Further, evenness of optical transmittance ratio can be also assured, so that reduction of display unevenness can be provided when overlapped with a display device. In this case, when the openings 14p, 15p are arrange at intervals, if a formation cycle of the openings is equal to a dot pitch or a pixel pitch of the display device, moire may be caused. Accordingly, it is preferable to determine the intervals in consideration for the pixel pitch of the display device to be placed. That is it is preferable that the formation cycle of the openings 14p, 15p and the dot pitch or the pixel pitch of the display device are different. Specifically, it is preferable to set the pitch of the openings 14p, 15p to avoid a divisor or a multiple (including one time) of the dot pitch or the pixel pitch. Further, occurrence of a moire stripe can be prevented by arranging the openings 14p, 15p at different pitches so as not to correspond with the dot pitch or the pixel pitch.

Note that the opening shape of opening 14P, 15P is not limited to the rectangular shape, and any shape such as a circle shape, an elliptical shape, an oval shape, a polygonal shape may be employed.

Each of the openings 14p is arranged so as to be overlapped with the corresponding one of the openings 15p in plan view. The overlapping of the openings 14p and the openings 15p in plane view forms opening regions in which the electrode films 14, 15 do not exist. This enables to increase the transmittance ratio as a whole. Herein, it is possible that the openings 14p and the openings 15p are formed so as not to be overlapped in plan view. However, in this case, it is necessary to reduce the opening area and number of the openings in order to constitute the pair of the electrode film 14 and the electrode film 15 so as to be able to be made contact with each other. However, this prevents to increase the transmittance ratio. Accordingly, it is preferable to employ the aforementioned constitution.

Particularly, in the example shown in FIG. 4, the opening range 14pa of the opening 14p is narrowly formed than the opening range 15pa of the opening 15p, and is arranged in the opening range 15pa. By forming the opining range 14pa narrower than the opening range 15pa, even when a horizontal shift is occurred when bonded between the first substrate 11 and the second substrate 12, the opening 14pa and the opening 15p can be formed so as to be always overlapped with each other in plan view. Further, when the shift is within a certain degree range, the area in which the openings are overlapped with each other can be set so as not to be changed. Accordingly, by setting the difference between the opening areas of the opening range 14pa and the opening range 15pa, fluctuation of the transmittance ratio can be reduced and yield of the product can be improved.

In the example shown in FIG. 4, the opening areas of the opening 14p and the opening 15p are different but the shapes thereof are similar. Accordingly, by positioning the barycenter positions of the opening ranges so as to be matched in plan view when bonding, the effect that fluctuation of the transmittance ratio and deterioration of yield can be restrained can be obtained even when the shift is occurred in any direction between the both substrates.

The opening areas of the aforementioned openings 14p, 15p are not particularly restricted. However, it is preferable that the circle equivalent diameters are within the range of 5 μm to 500 μm. When the circle equivalent diameter is not more than 5 μm, it becomes difficult to perform patterning of the electrode film and the shape accuracy of the opening is deteriorated. This invites problems such as difficulty of manufacturing, deterioration of yield, and the like. When the circle equivalent diameter exceeds 500 μm, there is a fear in that a displayed image is influenced and visibility is deteriorated due to generation of a fringe pattern or deterioration of image quality. Further, when the circle equivalent diameter is further increased, there is a case that the only the opening is pressed and the pair of the electrode films are not made contact in the case where a tapered pressing tool such as a touch pen is used. Particularly, it is preferable that the circular equivalent diameter is within the range of 30 μm to 200 μm by the reason of manufacturing and light theory similar to the aforementioned reason. In the embodiment, the openings 14, each of the openings 14 having a square shape whose one side is 40 μm, are provided in the electrode film 14 and the openings 15, each of the openings 15 having a square shape whose one side is 50 μm, are provided in the electrode film 15 respectively to have the pitch length of 100 μm.

Note that the thickness of the electrode films 14, 15 generally may be about 300 nm to 1000 nm. However in the case of the embodiment, the openings 14p, 15p are formed in the electrode films 14, 15. Accordingly, in order to assure the resistivity and uniformity thereof, it is preferable that the thickness of the electrode films 14, 15 is not less than 500 nm. Further the sizes of the opening 15p and the opening 14p are different, so that the resistance value per unit area becomes different when the electrode films 14, 15 are formed to have a same thickness. Consequently, the resistance values of the electrode film 14 and the electrode film 15 may be adjusted by forming the thicknesses of the electrode film 15 and the electrode film 14 so as to be different as necessary. In the case of the embodiment, the opening 15p is larger than the opening 14p, so that it is preferable that the thickness of the electrode film 15 is set larger than the thickness of the electrode film 14.

In the case of the example shown in FIGS. 3, 4, the spacer 17 is formed in the opening 14p. The spacer 17 is formed in a part of the openings 14 (opening range of the opening 15p) arranged at appropriate intervals among the plurality of the opening 14p as is also depending on the opening area of the opening in practice. Herewith, it becomes difficult that the spacer 17 influences the contact state of the pair of the electrode films 14, 15. Further, since the spacer 17 can be directly formed on the first substrate 11, there are effects described below. For example, adhesiveness can be enhanced, damage of the electrode film 15 can be prevented as the tip of the spacer 17 is made contact with the inner surface of the second substrate 12 in the opening 15p of the opposing electrode film 15, and the height of the spacer 17 can be set regardless of the thicknesses of the electrode films 14, 15. However, the spacer 17 may be formed in the formation range of the electrode films 14, 15 and may be formed across both of the formation range and the opening range of the opening. In the cases, the spacer is formed on any one of the electrode films.

In the embodiment, the plurality of the openings 14p, 15p are dispersed and formed in the electrode films 14, 15. Herewith, it becomes possible to increase the transmittance ratio in accordance with the ratio of the total of the opening areas of the plurality of openings 14p, 15p with respect to the perspective region A of the touch panel. Further, by providing the aforementioned openings 14p, 15p, the surface of the electrode film is formed to have irregularities. Accordingly, it is prevented that the pair of the electrode films are stuck to each other and thereby generation of noise can be also prevented when the electrodes are unstuck.

Second Embodiment

Figure 5:
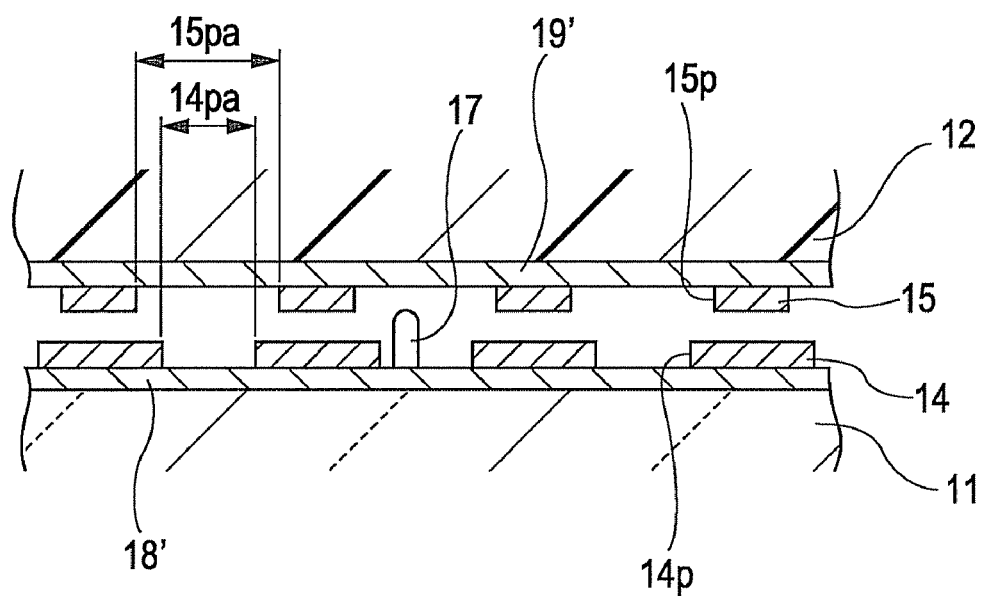
FIG. 5 is a partial enlarged longitudinal section view schematically showing an outline of an inner structure of a second embodiment.

FIG. 5 is a partial enlarged cross sectional view of a second embodiment showing an example in which reflection preventing films 18', 19' are formed on the inner surfaces of the first substrate 11 and the second substrate 12. In the embodiment, the reflection preventing film 18' is formed on the first substrate 11 and the electrode film 14 is laminated on the reflection preventing film 18'. Further the reflection preventing film 19' is formed on the second substrate 12, and the electrode film 15 is formed on the reflection preventing film 19'. The reflection preventing films 18', 19' may be constituted by laminating $SiO_2$, $TiO_2$, or the like or by a single layer similar to the aforementioned reflection preventing films 18, 19. In this case, the openings 14p, 15p are provided in the electrode films 14, 15. Accordingly, efficient effect can be obtained even when the reflection preventing films 18', 19' are specialized to have reflection preventing function with respect to the surface reflection at the first substrates 11 and the second substrate 12. Accordingly, the designing of the reflection preventing layer becomes easy and the freedom degree of the designing becomes higher.

Note that the reflection preventing layers 18', 19' may be formed together with the aforementioned reflection preventing layers 18, 19. Further, the constitution of the reflection preventing films 18' 19' in the formation region of the electrode films 14, 15 may be different from the constitution of the reflection preventing films 18' 19' in the opening ranges of the openings 14p, 15p. By employing an optical designing in which existence of the electrode films is considered in the formation region of the electrode films and an optical designing in which existence of the electrode films is not considered in the aforementioned opening ranges, the reflectance ratio can be efficiently reduced in both of the formation region of the electrode films and the openings.

Third Embodiment

Figure 6:
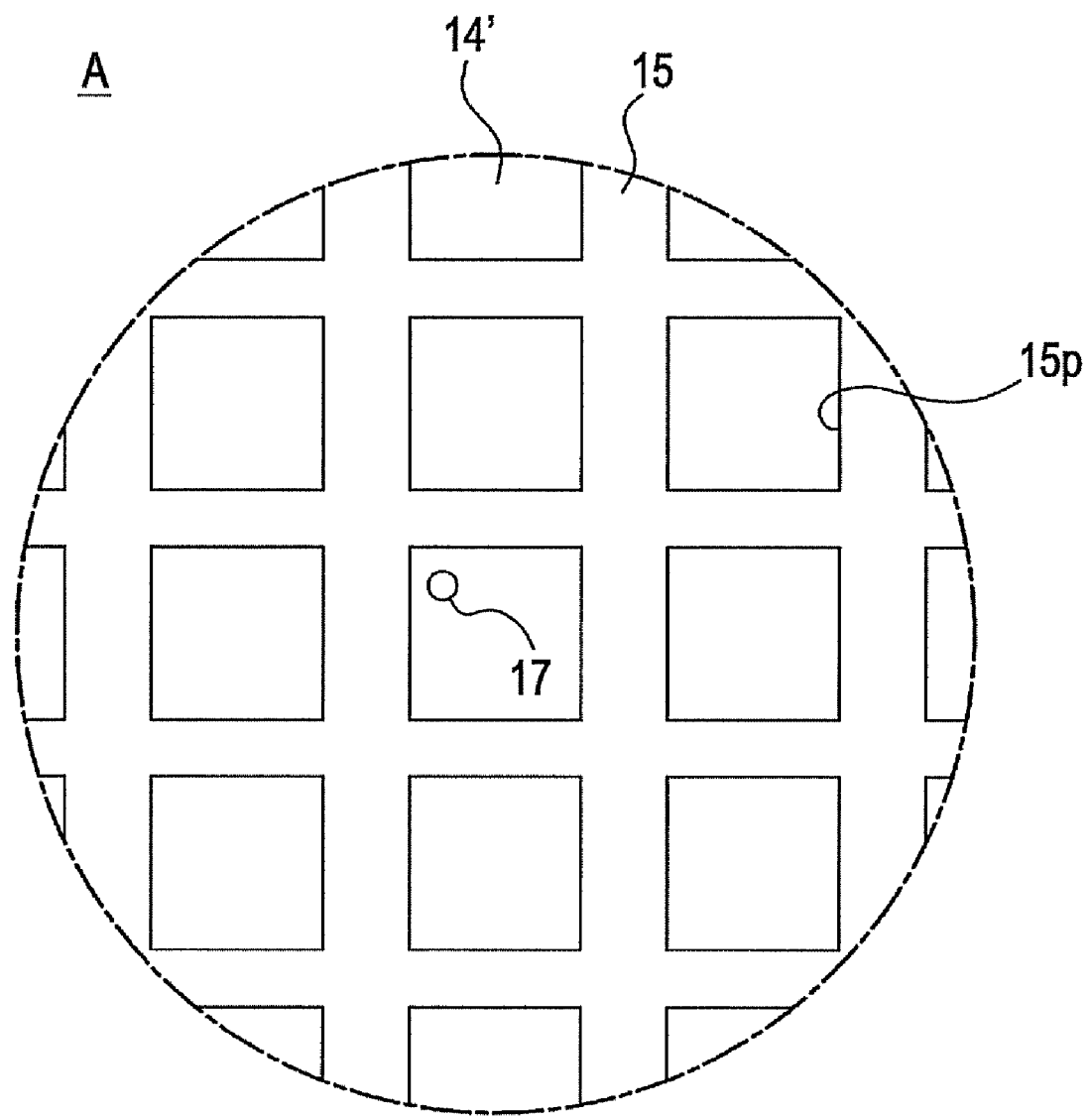
FIG. 6 is a partial enlarged plan view schematically showing an outline of an inner structure of a third embodiment.
Figure 7:
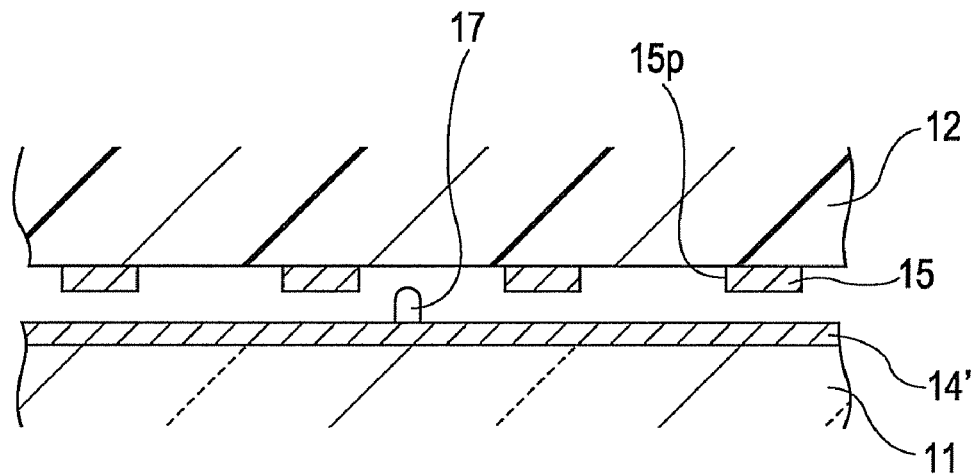
FIG. 7 is a partial enlarged longitudinal section view schematically showing an outline of an inner structure of the third embodiment.

FIG. 6 is a partial enlarged plan view showing a third embodiment, and FIG. 7 is a partial enlarged longitudinal section view showing the third embodiment. In the embodiment, the same reference numerals are used to denote the same elements corresponding to those in the aforementioned embodiment and descriptions thereof will be omitted. In the embodiment, an example is shown in which openings are formed only in one electrode film among the pair of electrode films and openings are not formed in the other electrode film.

In the embodiment, the openings are not formed in the electrode film 14' formed on the first substrate, and an electrode structure is employed in which the electrode film 14' is formed in the entire of the perspective region A (see FIG. 2) in a flat manner. On the other hand the openings 15p are formed in the electrode film 15 formed on the second substrate 12 similarly to the first embodiment.

In the embodiment, improvement degree of the transmittance ratio is not so high as the openings 15p are formed in only the electrode film 15 and no opening is formed in the other electrode film 14'. However, it is preferable in the points that the pair of electrode films is surely made contact with each other and there is no influence caused by shift between the both substrates.

Note that in the embodiment, the openings 15p are formed in the electrode film 15 provided at the viewing side, and no opening is formed in the electrode film 14' provided at the non viewing side. However, in reverse, no opening may be formed in the electrode film provided at the viewing side and openings may be formed in the electrode film 14 provided at the non viewing side.

Fourth Embodiment

Figure 8:
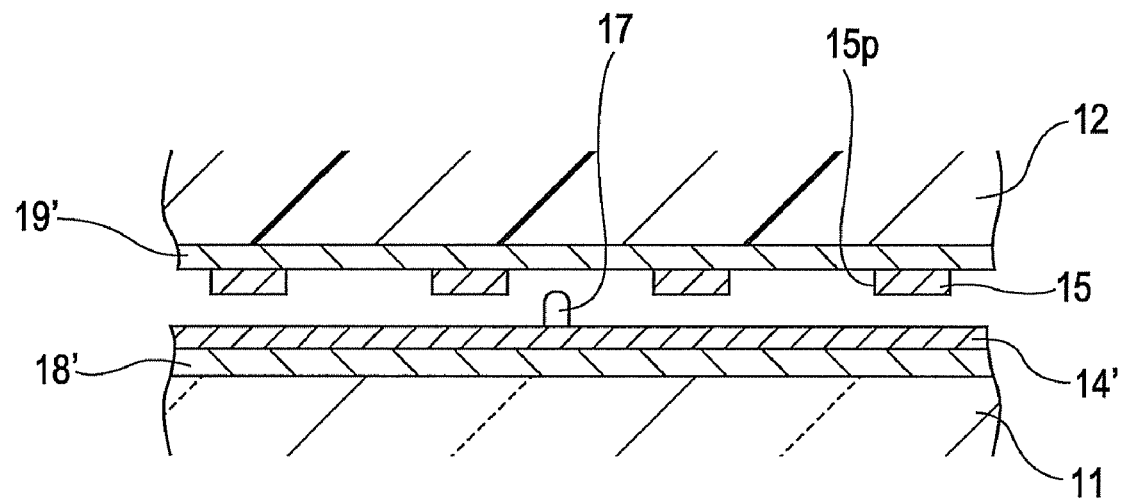
FIG. 8 is a partial enlarged longitudinal section view schematically showing an outline of an inner structure of a fourth embodiment.

Next, a forth embodiment of the invention will be described with reference to FIG. 8. FIG. 8 is a partial enlarged longitudinal section view showing the fourth embodiment. In the embodiment, the reflection preventing films 18' 19' are respectively formed on the inner surfaces of the first substrate 11 and the second substrate 12 similar to the second embodiment, and the electrode films 14', 15 are formed thereon similar to the third embodiment. The electrode films 14' 15, and the reflection preventing films 18', 19' can be constituted similar to the description of the aforementioned each embodiment.

In the case of the embodiment, it is preferable that the reflection preventing film 18' is designed so as to be able to reduce surface light reflected at both of the first substrate 11 and the electrode films 14' and the reflection preventing film 19' formed on the electrode film 15 equipped with the openings 15p is designed so as to be able to reduce surface light reflected at the second substrate 12.

Electro Optical Device

Figure 9:
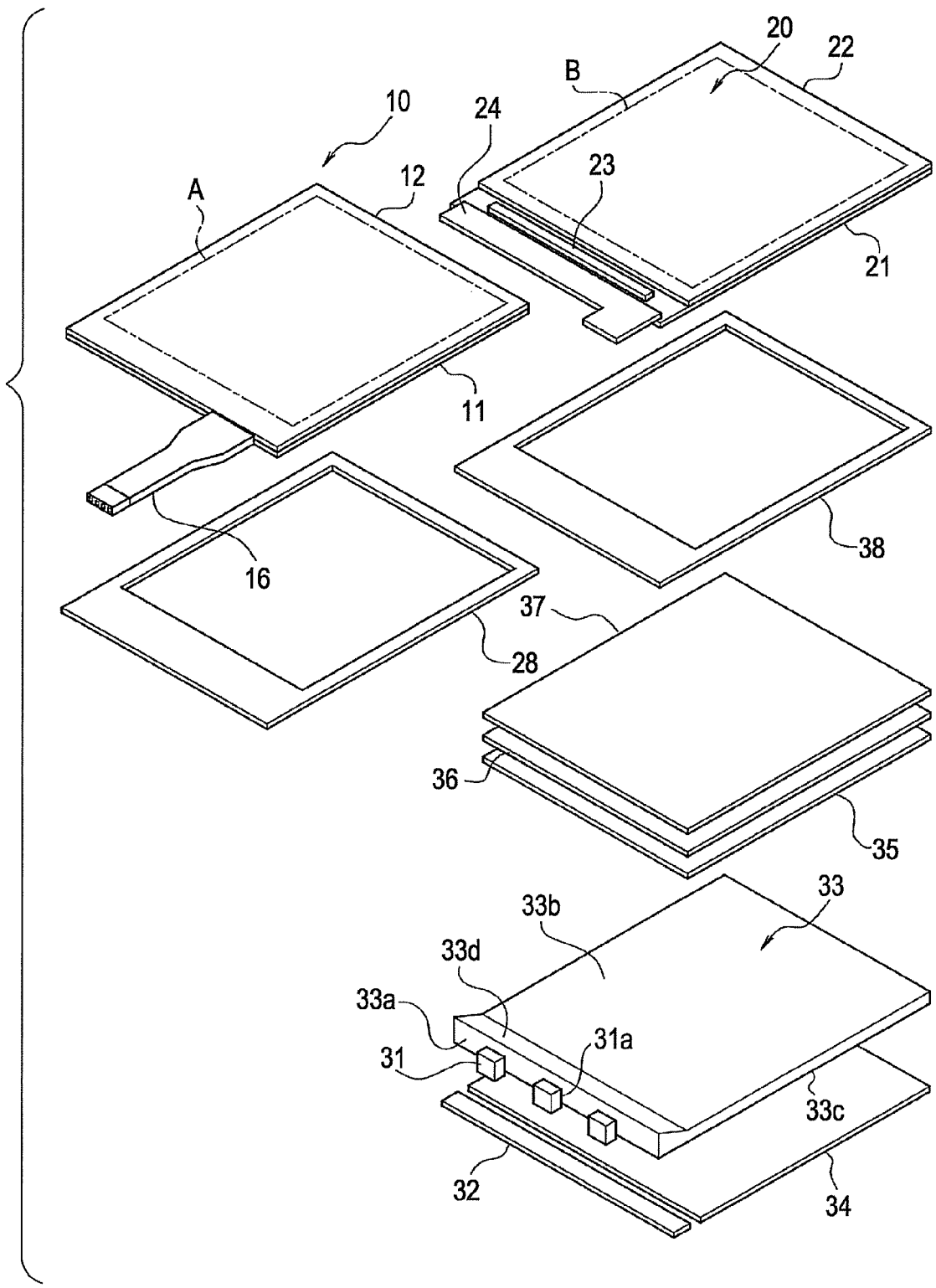
FIG. 9 is an exploded perspective view showing an embodiment of an electro optical device.

Next, a structure of an embodiment of an electro optical device equipped with the aforementioned touch panel will be described with reference to FIG. 9. FIG. 9 is an exploded perspective view showing the electro optical device of the embodiment. In the embodiment, the electro optical device is equipped with an elector optical panel 20 equipped with a display region B overlapping with the perspective region A of the touch panel 10 having the aforementioned structure.

In the electro optical panel 20, substrates 21, 22 made of a glass, a plastic, or the like are bonded together via a seal material or the like not shown, and an electro optical material such as liquid crystal not shown is disposed therebetween. Further, electrodes for applying electric field to an electro optical material are provided on at least one of the substrates 21, 22. Further, a substrate flared portion flared outside of the outline of the substrate 22 is formed on the substrate 21, and a driving circuit 23 made of a semiconductor IC chip and the like and a wiring member 24 made of a flexible wiring substrate and the like are mounted on the substrate flared portion.

An illuminating device constituting a back light is disposed behind the aforementioned electro optical panel 20 (anti viewing side). Specifically, the illuminating device includes light sources 31 and a light guide plate 33. The light emitted from light emitting surfaces 31a of the light sources 31 is introduced from a light introducing surface 33a, dispersed in the light guide plate 33, and output from a light emitting surface 33b. Herewith, illumination light can be obtained in a flat manner. The light source 31 is constituted by an LED or the like, and preferably, a plurality of light sources 31 are mounted on a light source substrate 32. A reflection sheet 34 made of white color polyethylene or the like is disposed on a back surface 33c of the light guide plate 33. Further, optical sheets such as a light defusing plate 35, light condensing sheet 36, 37, and the like are laminated and disposed on the light emitting surface 33b of the light guide plate 33. Note that an oblique surface portion 33d is formed between the light introducing surface 33a and the light emitting surface 33b in the light guide plate 33 in order to reduce the thickness of a portion in which the light emitting surface 33b is provided and in order to set the thickness of the light introducing surface 33a so as to correspond to the thickness of the light emitting surfaces 31a of the light sources 31.

In the embodiment, a light shielding sheet 38 is formed at the light emission side of the illuminating device and the aforementioned electro optical panel 20 is disposed via the light shielding sheet 38. The light shielding sheet 38 is constituted so as to shield needless light that illuminates the range except the illumination rage by which the entire of the aforementioned display region B can be surly illuminated.

Further a light shielding sheet 28 is disposed between the touch panel 10 and the electro optical panel 20 at the viewing side, and needless light that illuminates the range except the aforementioned perspective region A and the display region B is to be shielded by the light shielding sheet 28.

According to the embodiment, the perspective region A of the touch panel 10 is disposed on a displayed image formed by the electro optical panel 20. Accordingly, by pressing a predetermined position in the perspective region A so as to correspond to a content of the displayed image, the pressed state and the position are detected.

Figure 10:
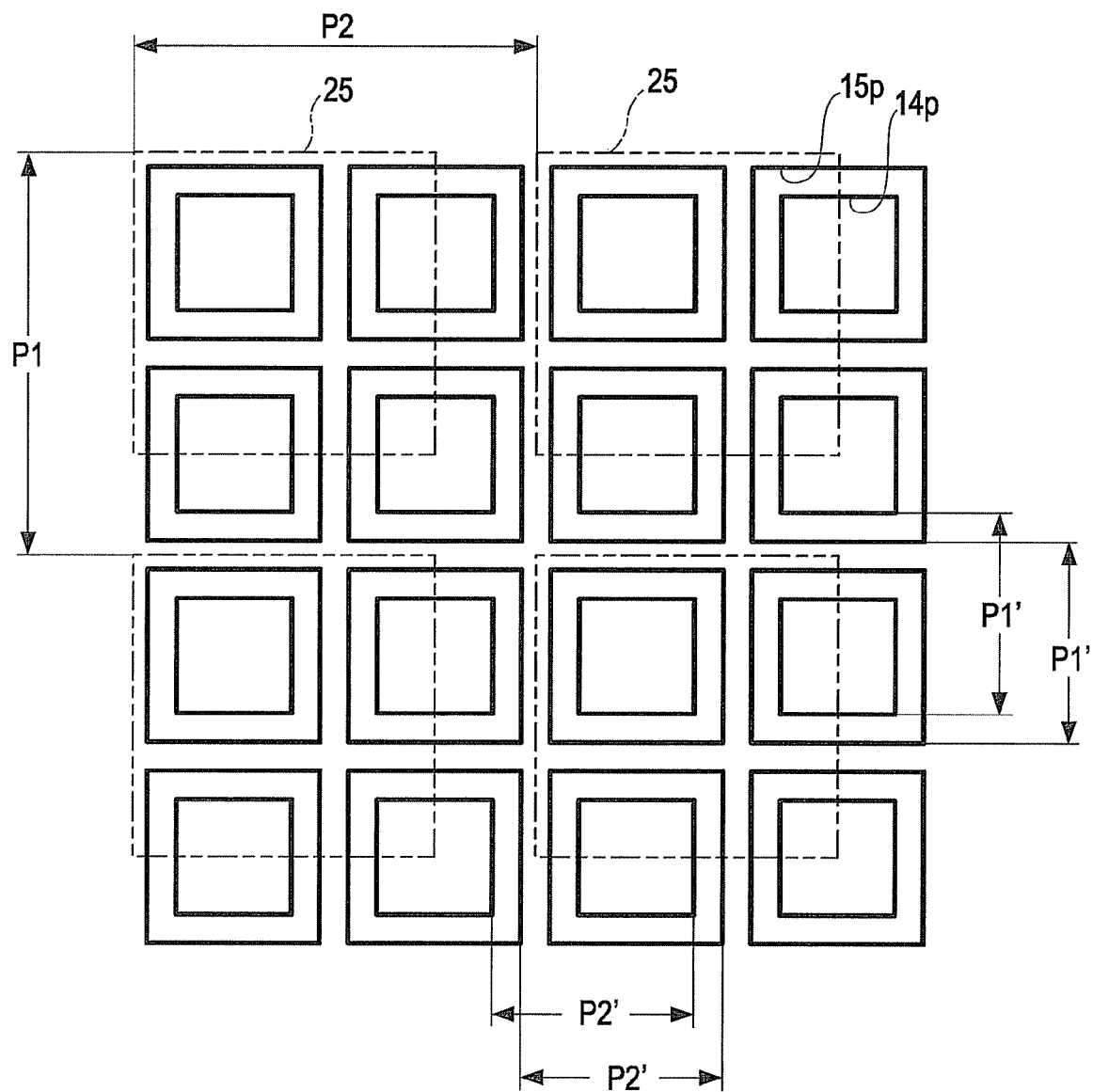
FIG. 10 is a partial enlarged plan view showing an outline of the electro optical device.

FIG. 10 shows an example of the positional relationship between the dot arrangement of the electro optical panel 20 and the openings 14*p*, 15*p* provided in the electrode films 14, 15. In the embodiment, the touch panel described in the first embodiment is used. The electro optical panel 20 is equipped with dots 25 regularly arranged in a matrix manner to have the vertical pitch P1 (P1=220 μm) and the traverse pitch P2 (P2=100 μm). On the other hand, the openings 14*p*, 15*p* provided in the electrode films 14, 15 are arranged to have the vertical pitch P1' (P1'=100 μm) and the traverse pitch P2' (P2'=100 μm). The pitches of the openings 14*p* and the openings 15P are the same in the example. Since the arrangement pitches P1', P2' of the openings 14*p*, 15*p* and vertical pitch P1 and traverse pitch p2 of the electro optical panel 20 are respectively different, no moire stripe is generated, and a good image can be obtained.

In the embodiment, the sizes of the openings 14*p*, 15*p* are set smaller than the dot size of the elector optical panel. It is possible to relate portions except the openings 14*p*, 15*p* to each of the dots of the elector optical panel. Accordingly, it becomes possible to detect a position with high accuracy for every dot.

In the embodiment, the dot pitch which is the minimum unit of display and the pitch of the openings are different. When color display is performed by the electro optical panel, one pixel may be constituted by a plurality of dots, for example, three dot of RGB. In this case, the same effect as that in the embodiment can be obtained by setting the pixel pitch and the pitch of the openings 14*p*, 15*p* so as to be different.

Incidentally, even when the pitch of the openings and the dot or pixel pitch are different, when the pitch of the openings is a divisor or a multiple of the dot or pixel pitch, a moire stripe may be generated. In this case, the pitch of the openings may be set to avoid a divisor or a multiple (including one time) of the dot or pixel pitch.

Besides the example shown in FIG. 10, when a touch panel in which the openings are provided only in one electrode film as shown in FIGS. 6, 7 is employed, generation of a moire stripe can be prevented by setting the dot pitch or pixel pitch and the pitch of the openings so as to be different or by setting the pitch of the openings to avoid a divisor or a multiple of the dot pitch or pixel pitch.

Further, the plurality of openings 14*p*, 15*p* may be formed so that both of the pitches or one of the pitches becomes irregular so that the pitch of the pixels and the pitch of the openings are not matched. In this case, the plurality of the openings 14*p* may have a different size to each other and the plurality of the openings 15*p* may have a different size to each other.

As for the electro optical panel 20, besides a liquid crystal panel, various kinds of display panels such as an electrophoresis panel, an organic EL panel, or the like can be used. In the embodiment, the example is described in which the touch panel 10 and the electro optical panel 20 are overlapped. However, the invention can be also applied to an electro optical device in which the touch panel 10 and the electro optical panel 20 are united, for example, the first substrate of the touch panel 10 is used also as the substrate 22 of the electro optical panel.

Electronic Apparatus

Figure 11:
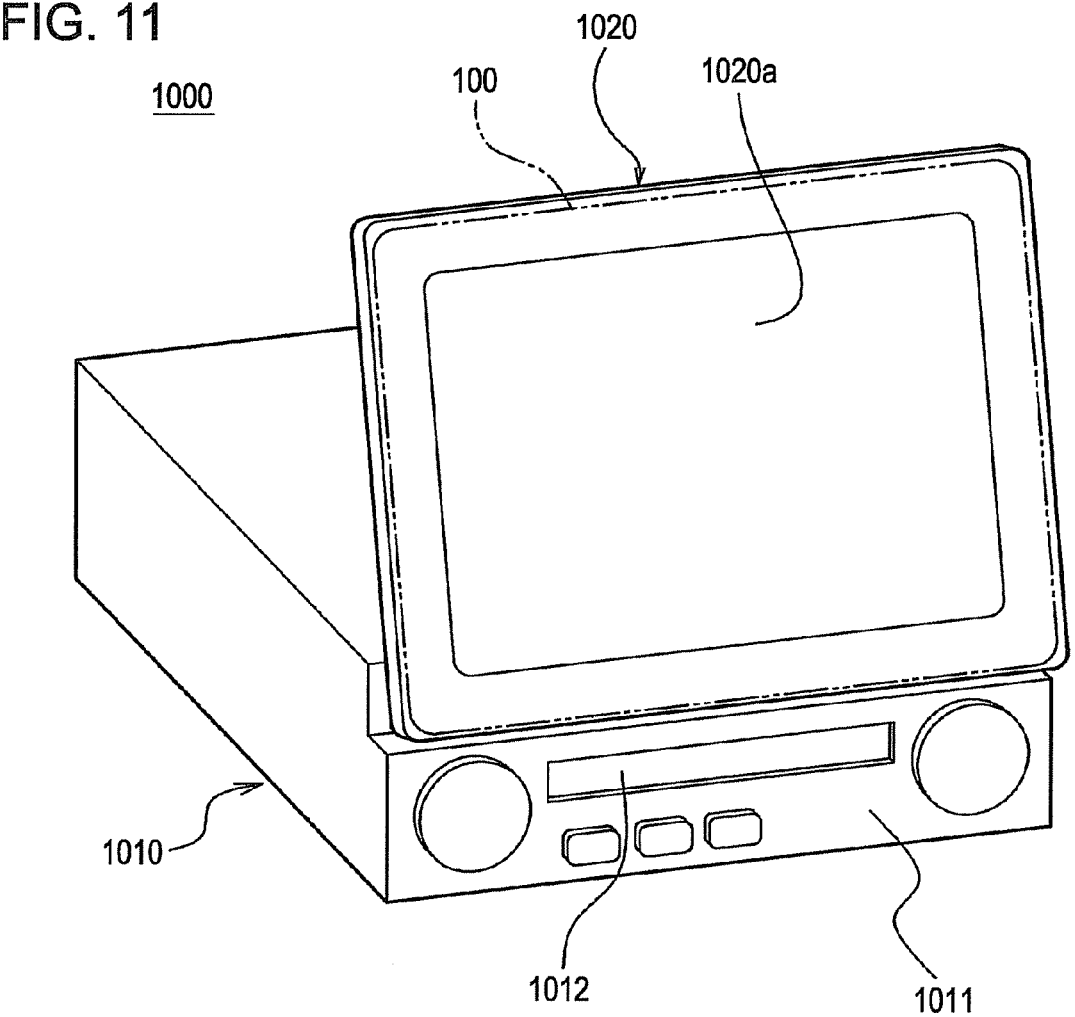
FIG. 11 is a perspective view showing an outline of an example of an electronic apparatus.
Figure 12:
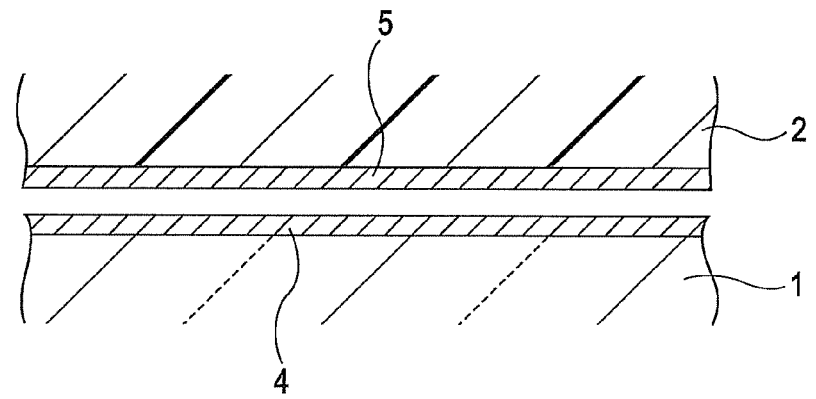
FIG. 12 is a partial enlarged longitudinal section view schematically showing an outline of an inner structure of a conventional touch panel.

Finally, an example of an electronic apparatus in which the aforementioned electro optical device is mounted will be described with reference to FIG. 11. FIG. 11 is a perspective view showing an outline of an appearance of the example of the electronic apparatus according to the invention 11. The electronic apparatus 1000 shown in FIG. 11 is a car navigation system and is equipped with a main body 1010 and a display unit 1020 connected to the main body 1010. An operation face 1011 on which operation buttons and the like are disposed and an accommodation unit 1012 for accommodating a recording medium such as a DVD, a HD, or the like are provided in the main body 1010. The aforementioned electro optical device 100 is housed inside the display unit 1020, and display performed by the electro optical device 100, that is, display of an image for navigation can be viewed on a display screen 1020*a* of the display unit 1020.

The touch panel 10 of the aforementioned each embodiment is exposed on the surface of the display unit 1020, and when the touch panel 10 is pressed, that a predetermined position corresponding to a content of the displayed image is pressed and the position are to be detected. Then, a predetermined internal processing is executed in accordance with the detection and the position, and the displayed image is changed in accordance with the detected position when required.

It should be noted here that the electro optical device and the electronic apparatus of the invention are not limited to the aforementioned examples shown with reference to the drawings. It goes without saying that various modifications may be made without departing from the scope of the gist of the invention.

The entire disclosure of Japanese Patent Application Nos: 2007-266202, filed Oct. 12, 2007 and 2008-107531, filed Apr. 17, 2008 are expressly incorporated by reference herein.

What is claimed is:

1. A touch panel comprising:
    a first substrate;
    a second substrate opposing the first substrate;
    a first electrode film formed on the first substrate;
    a second electrode film formed on the second substrate, the second electrode film opposing the first electrode film, wherein
    an openings is formed in each of the first electrode film and the second electrode film, and the opening formed in the first electrode film and the opening formed in the second electrode film are overlapped in plan view and each of the openings has a different opening area.

2. The touch panel according to claim 1, wherein a plurality of the openings are formed in each of the first electrode film and the second electrode film.

3. The touch panel according to claim 1, wherein an opening range of one of the openings is smaller than an opening range of the other opening, and the opening range of the one of the openings is included in the opening range of the other opening.

4. The touch panel according to claim 3, wherein shapes of the one of the openings and the other opening are similar to each other.

5. The touch panel according to claim 3, wherein the second substrate is to be pressed among the first substrate and the second substrate, and an opening area of the opening formed in the first electrode film is smaller than an opening area of the opening formed in the second electrode film.

6. The touch panel according to claim 5, wherein the second substrate includes a flexible base material, and the first substrate is harder than the second substrate.

7. The touch panel according to claim 2, wherein an opening range of one of the openings formed in the first substrate is included in an opening range of one of the openings formed in the second substrate, and an opening range of another opening formed in the second substrate is included in an opening range of another opening formed in the first substrate.

8. The touch panel according to claim 1, wherein a reflection preventing film is formed on at least one of the openings.

9. The touch panel according to claim 1, wherein a spacer is disposed so as to correspond to the opening formed in the first electrode film or the opening formed in the second electrode film.

10. The touch panel according to claim 9, wherein the spacer is disposed at a position at which the opening formed in the first electrode film and the opening formed in the second electrode film are overlapped in plan view.

11. A touch panel comprising:
a first substrate;
a second substrate opposing the first substrate;
a first electrode film formed on the first substrate;
a second electrode film formed on the second substrate, the second electrode film opposing the first electrode film, wherein
an opening is formed in at least one of the first electrode film and the second electrode film, and a spacer is disposed so as to correspond to the opening.

12. The touch panel according to claim 11, wherein the opening is formed in each of the first electrode film and the second electrode film, and the spacer is disposed at a position at which the opening formed in the first electrode film and the opening formed in the second electrode film are overlapped in plan view.

13. The touch panel according to claim 12, wherein
an opening area of the opening formed in the first electrode film is smaller than an opening area of the opening formed in the second electrode film, and
the spacer is provided at the first substrate side.

14. An electro optical device, wherein
the touch panel according to claim 1 is disposed so as to overlap with a display region.

15. An electro optical device in which a touch panel is disposed so as to overlap with a display region in which a plurality of dots or pixels are arranged, wherein the touch panel includes
a first substrate,
a second substrate opposing the first substrate,
a first electrode film formed on the first substrate,
a second electrode film formed on the second substrate, the second electrode film opposing the first electrode film, and wherein
a plurality of openings are arranged in at least one of the first electrode film and the second electrode film, and an arrangement pitch of the plurality of dots or pixels and an arrangement pitch of the plurality of openings are different.

16. An electronic apparatus mounting the electro optical device according to claim 15.

* * * * *